Feb. 10, 1942. G. WALD Re. 22,025

PICTURE AND SOUND APPARATUS

Original Filed Nov. 6, 1929 5 Sheets-Sheet 1

Inventor:
George Wald
By Kingsland, Rogers & Lyell
Attorneys.

Feb. 10, 1942. G. WALD Re. 22,025

PICTURE AND SOUND APPARATUS

Original Filed Nov. 6, 1929 5 Sheets-Sheet 2

Inventor:
George Wald
by Kingsland, Rogers & Zell
Attorneys.

Feb. 10, 1942. G. WALD Re. 22,025

PICTURE AND SOUND APPARATUS

Original Filed Nov. 6, 1929 5 Sheets-Sheet 3

Inventor
George Wald
by D. Kingsland, Rogers & Lyell
Attorneys.

Feb. 10, 1942. G. WALD Re. 22,025

PICTURE AND SOUND APPARATUS

Original Filed Nov. 6, 1929 5 Sheets-Sheet 4

INVENTOR
George Wald
BY Dwell, Baker & Smart
ATTORNEY

Feb. 10, 1942. G. WALD Re. 22,025

PICTURE AND SOUND APPARATUS

Original Filed Nov. 6, 1929 5 Sheets-Sheet 5

Inventor:
George Wald
By Kingsland, Rogers & Ezell
Attorneys.

Reissued Feb. 10, 1942 Re. 22,025

UNITED STATES PATENT OFFICE 22,025

PICTURE AND SOUND APPARATUS

George Wald, Fort Totten, N. Y.

Original No. 2,111,159, dated March 15, 1938, Serial No. 405,121, November 6, 1929. Application for reissue June 8, 1939, Serial No. 278,089

21 Claims. (Cl. 178—5.6)

This invention relates to apparatus for receiving, transmitting and reproducing images and audible signals.

An object of the invention is to provide an apparatus whereby images and audible signals may be received and transmitted over a single transmission means, and reproduced concurrently.

Another object of the invention is to transform an audible signal into a light impulse and transmit the same, together with a light impulse produced by an image over a conductor or radio carrier wave as a combined signal and then reconvert said signal into an image producing light impulse and a sound producing impulse projecting said image producing light impulse so that it may be visibly seen and transforming said sound producing impulse into an electric current variation which is reproduced as sound at the receiver.

The full advantages of the invention will be apparent from the following detailed description taken in connection with the accompanying drawings, in which—

Figure 3:
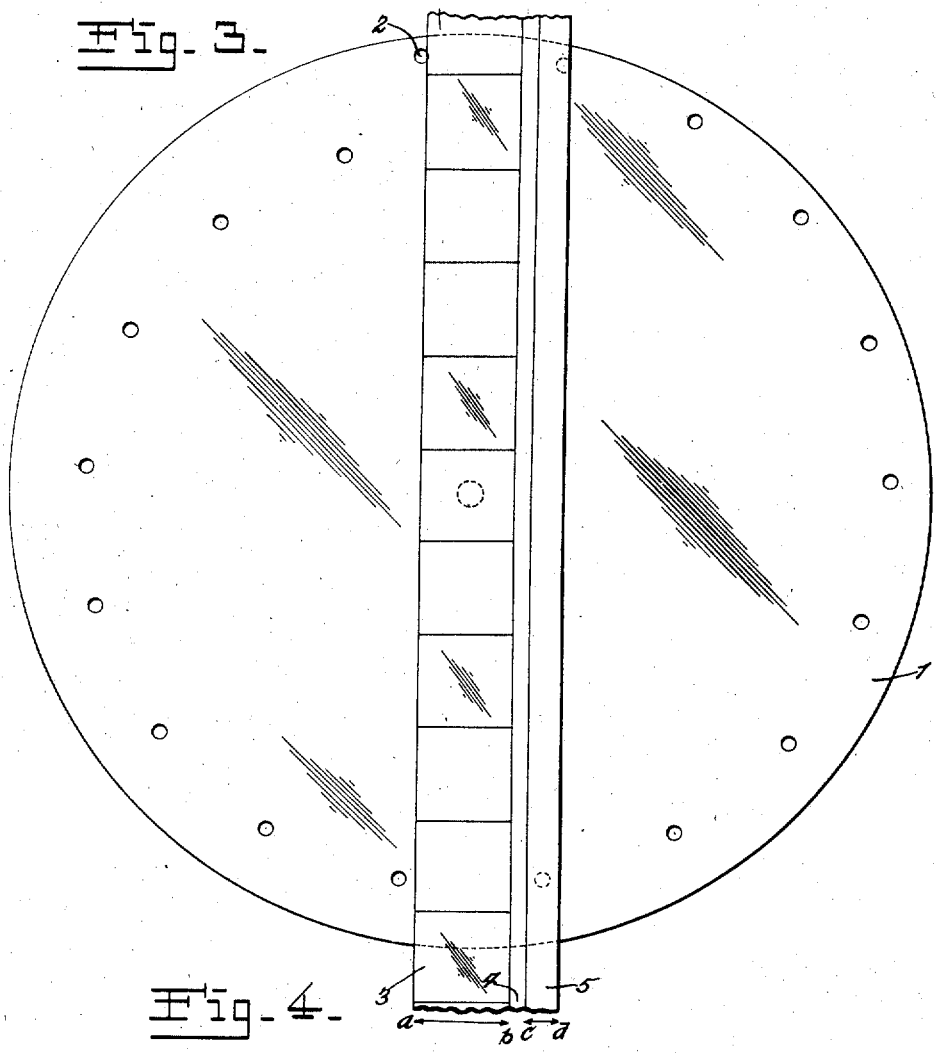
Fig. 3 is a diagrammatic view illustrating the screen disc televisor for reception of an image and audible signal from a combined image and audible reproducing signal film.

In order that the theory and operation of the apparatus may be understood, reference will be made first to Fig. 3 of the drawings in which the sending or receiver portion of the apparatus is illustrated in its simplest form. In this view 1 indicates a scanning disc familiar to the art of television. This disc, it will be understood, is rotated at a predetermined speed and scans the image which, by known means, is reproduced at a receiver. The familiar scanning disc has a plurality of small openings 2 arranged in spiral form, each line of the image being scanned being traced by each rotation of the disc. In Fig. 3 it is assumed that by known mechanism a film, comprising image sections 3, an intermediate blank section 4 and an audible signal section 5, is passed across the face of the disc transversely of the scanning disc openings. In the film assumed in Fig. 3 of the drawings, the image and audible signals are synchronized in transverse alinement on the film. As the film is actuated during the rotation of the scanning disc, it will be understood that the current fluctuations in the photoelectric cell, influenced by the scanning disc, will vary in each line traced in response both to the image signal and the audible signal of the film. That is to say, the photoelectric cell will reproduce a current at the receiver proportionate to each line of the entire width of the film. The part of each line traced from *a—b* reproduces a television current which skips over the blank space 4 of the film, the portion from *c—d* reproducing an audible current signal. These two signals, due to the current fluctuations in the photoelectric cell, may be transmitted on a single carrier wave or on a line conductor.

Figure 1:
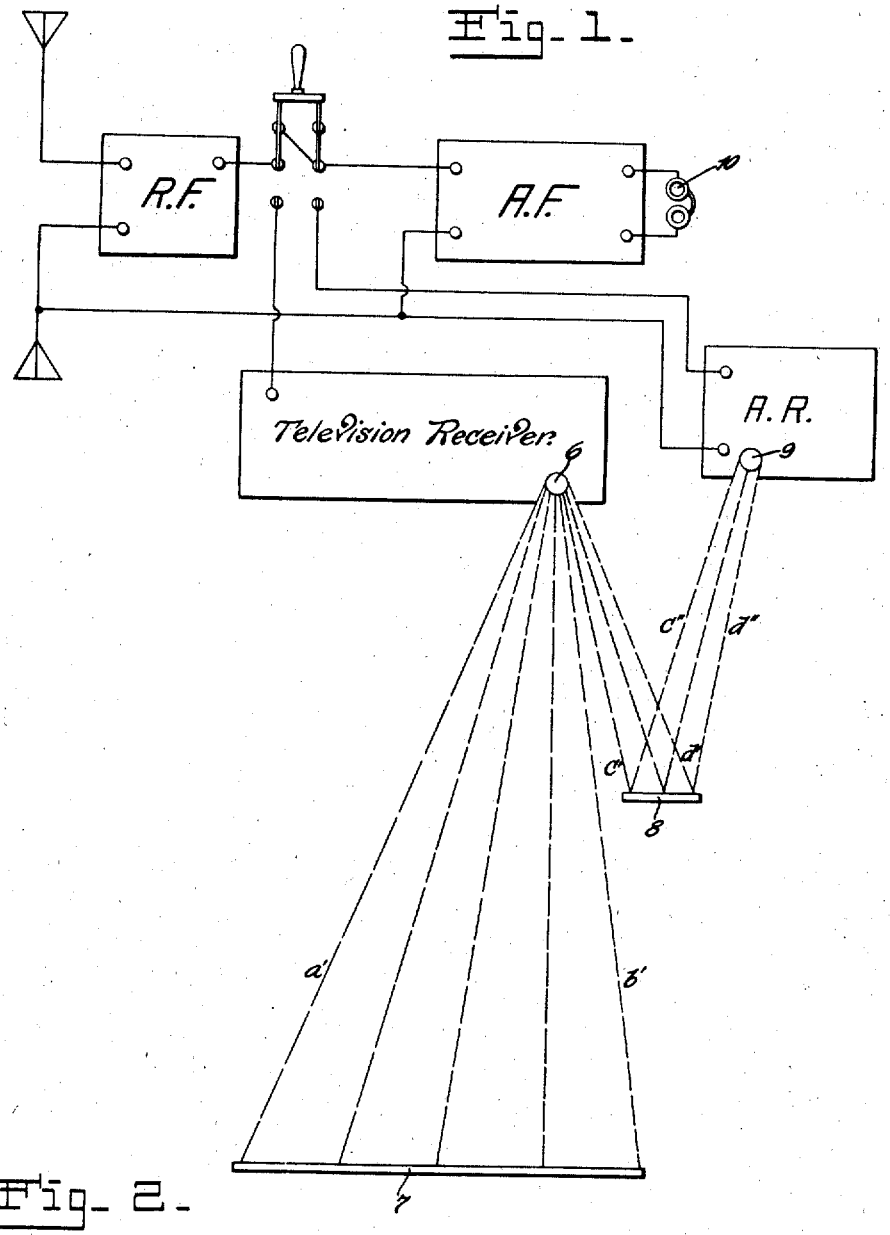
Fig. 1 is a diagrammatic view illustrating the circuits for receiving and translating the audible and image signal.
Figure 2:
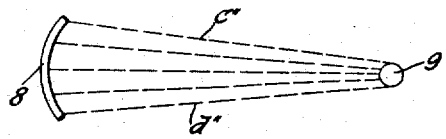
Fig. 2 is a diagrammatic view illustrating the reflector of the audible signal translation device.

The signals thus sent over the carrier are received on the apparatus diagrammatically shown in Fig. 1, in which the part R. F. is the normal radio frequency receiver of any known type which may be directly connected with the part marked A. F. or the audio frequency section of the receiving apparatus. With this normal receiver there is associated for connection any known form of television receiver, which receives and translates the current impulses generated by the television signal. Connected with this apparatus is a part marked A. R., or "Audio signal receiver," whereby the light ray current is translated into an audio signal that is amplified by the usual audio frequency section of the receiver.

The impulses received in the television receiver influence the gas filled cell 6 so that a light ray is transmitted therefrom which includes both the image signal and the audible signal for each line traced at the sending apparatus. That portion of the ray that is indicated by $a'$—$b'$ is reflected directly to a screen 7. The cone of the ray is intercepted so that it is broken into a portion $c'$—$d'$ that corresponds to the audible signal. This portion of the ray is thrown on a mirror 8 and is reflected by the mirror on the photoelectric cell 9 of the audio receiver through the ray $c''$—$d''$. This produces a current fluctuation in the photoelectric cell 9 which is sent through the audio frequency circuit of the receiver, reproducing an amplified audible signal in the head phone or loud speaker device 10 connected with the audio frequency circuit.

Figure 4:
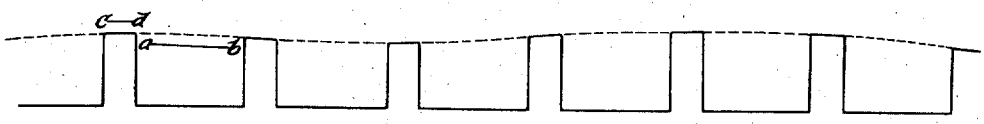
Fig. 4 is a diagrammatic view illustrating the current impulses produced by the audible signal.
Figure 5:
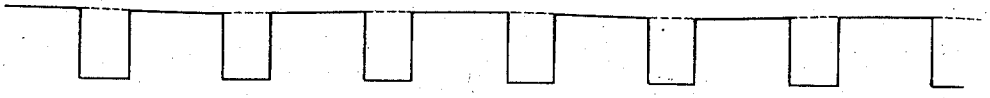
Fig. 5 is a diagrammatic view of the current impulses reproduced by the image reflection.

By reference to the diagrams of Figs. 4 and 5 the relationship of the current impulses will be understood. In Fig. 4 the audible portion of the wave impulses is shown, and in Fig. 5 the image portion of the wave impulse is shown. By comparing these views it will be understood that, from the standpoint of time duration for each line traced, the audible signal occupies one-fourth of the time, whereas the image impulse occupies three-fourths of the time. Due to the persistency of vision the interruption of the translated impulse is not perceptible to an observer. Likewise, the interruption of the audible signal will not be observable because the repetition of the signal is sufficiently continuous to reproduce the signal with substantial continuity, because the signal is passed through the photoelectric cell 9 to the audible receiver in the form of head phones or loud speaker. The photoelectric cell may be so designed as to have a lag, as likewise there is a lag in the audio frequency so that even through the audible signal is interrupted the final result will be one in which there is an apparent continuity of sound.

The sending and receiving apparatus thus described in its simplest form results in provision for the apparent simultaneous transmission of sound and light by sending a chain of electrical impulses some influenced by image or reflection and others by audible signals and the reception thereof at a receiver, whereby the separate signals are reproduced in their component parts. Obviously, therefore, the invention is accomplished in the apparatus in its simplest form. However, there are certain factors requiring variation in the sending apparatus and also in the receiving apparatus to reproduce the invention in its highest state of efficiency.

Figure 6:
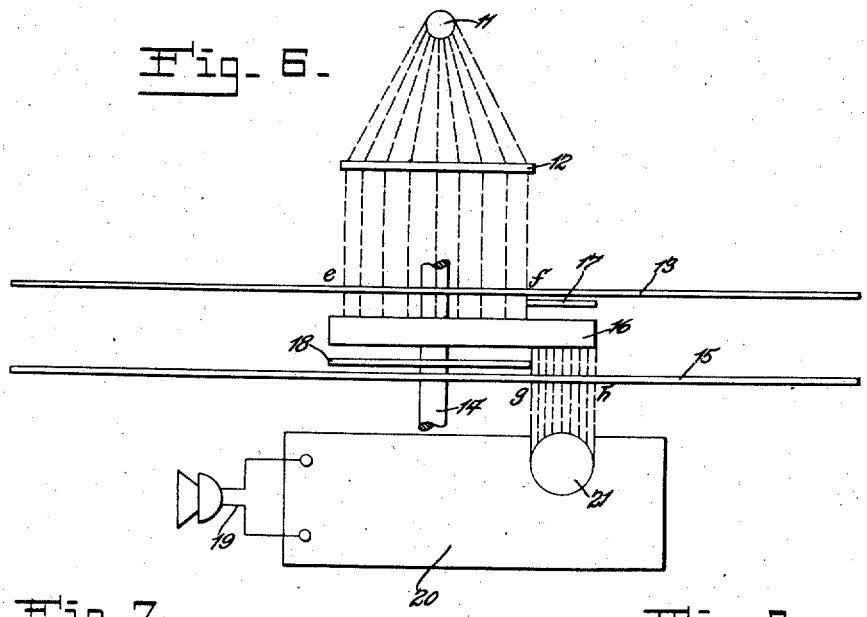
Fig. 6 is a diagrammatic view of a sending device for reproducing the reflection of a natural image and primarily generated audible signal.

In Figs. 6 to 9 the principles disclosed are applied to the sending of an image reflected from an object simultaneously with the primary generated audio signal. In Fig. 6 an image form 11 is reflected on a lens 12 and thrown on a scanning disc 13 which is mounted on a common shaft 14 carrying a second scanning disc 15, the two scanning discs operating in exact synchronism. The image from the object 11 is traced by the scanning disc 13 and is thrown on a photoelectric cell 16. The apparatus is so arranged that one-fourth of the distance between each pair of openings in the scanning disc 13 is masked by a screen 17. The distance between the openings in the scanning disc 15 is masked by a screen 18 so that approximately three-fourths of the space is screened. Thus, as each opening in the scanning disc 13 passes the path $e$—$f$ it influences the photoelectric cell 16 to reproduce an image signal, and as each opening in the disc 15 passes the path $g$—$h$ it influences the photoelectric cell 16 to reproduce an audible impulse generated from a microphone 19 connected into the transformer adjuster 20, and translated into a light ray by a tube 21. The tube 21 is adjusted to produce a ray which generates a current in the photoelectric cell 16 that will fluctuate in the same amplitudes as that of the television current generated by the reflected light from the image on the photoelectric cell 16. Thus, there is produced from the two sources a variable current in the photoelectric cell 16 corresponding in variation of amplitudes to that produced by the primary audible signal on the one hand for a portion of the time, and to the image reflection for the remainder of the time. An apparatus is thus produced whereby a live subject may speak or generate audible signals and, at the same time, be reproduced as a reflected image.

Figure 8:
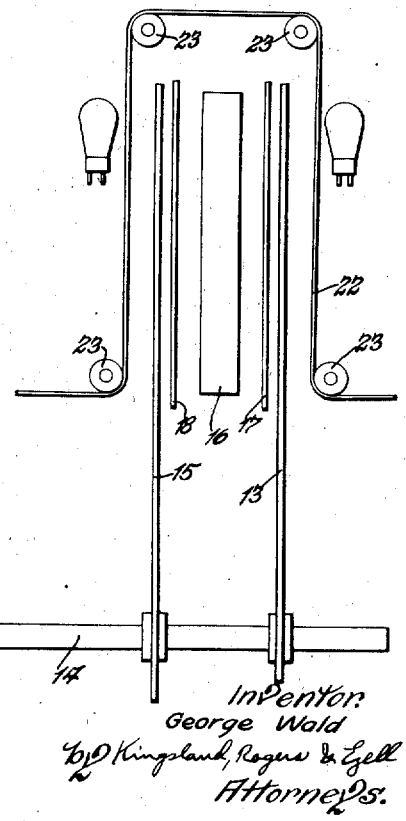
Fig. 8 is an apparatus constituting a modification of the sending apparatus for receiving and transmitting an image and audible signal from a standard talking motion picture film.
Figure 9:
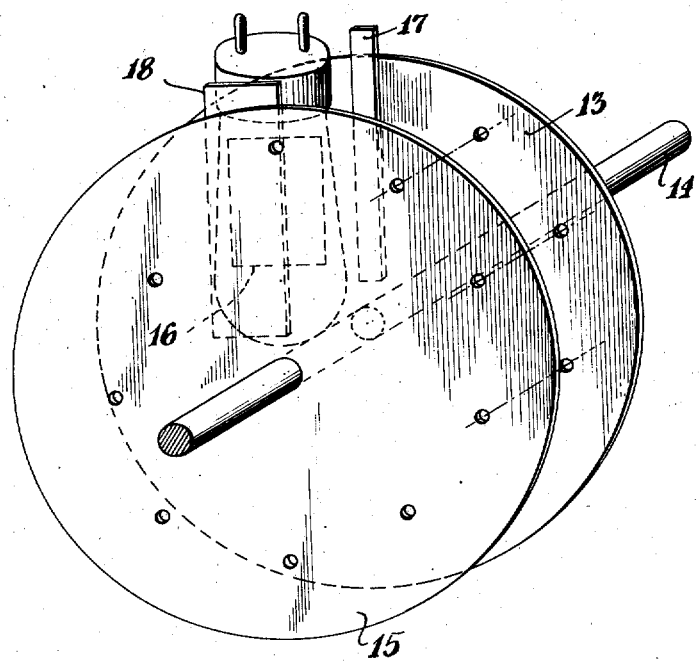
Fig. 9 is a perspective view of a portion of the apparatus of Fig. 6.

In Fig. 8 there is illustrated a form of apparatus adapted for the transmission of the image and audible signals from a standard form of so called talking moving picture film. This adaptation is necessary, because on the standard film, as is known, the image and the audible signal-generating means are not in alinement. In this apparatus, as illustrated in Fig. 8, the film 22 is formed in a U-shaped loop over rollers 23. The same form of double disc sending apparatus as shown in Fig. 6 is employed, therefore, similar parts have been given like reference numerals. The principles are otherwise the same.

Figure 7:
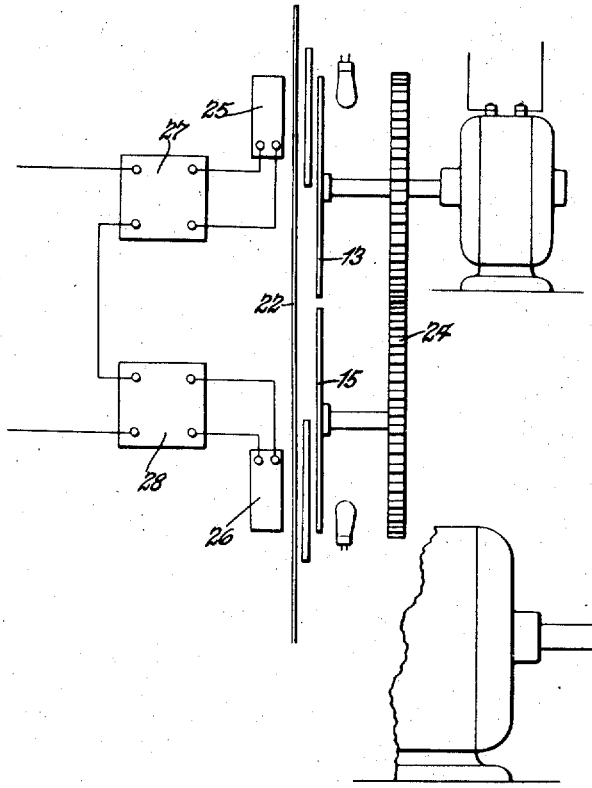
Fig. 7 is an illustration, in diagram form, of a modification of the sending apparatus employing a pair of scanning discs for separately receiving and combining the image signal and the audible signal.

In Fig. 7 there is shown a further modification of the sending apparatus in which the scanning discs are arranged in vertical alinement and geared together by gear wheels 24 so that they may be driven in synchronism. The film 22 in this instance is moved parallel to the parallel faces of the scanning discs. In this apparatus there are two photoelectric cells 25 and 26, connected in series. This arrangement permits the joint transmission of the signals received, the signals from the photoelectric cells 25 and 26 being sent through the same transmission means. Obviously, this apparatus may be used for object and original audible signals, instead of a combined image and audible signal film.

Figure 10:
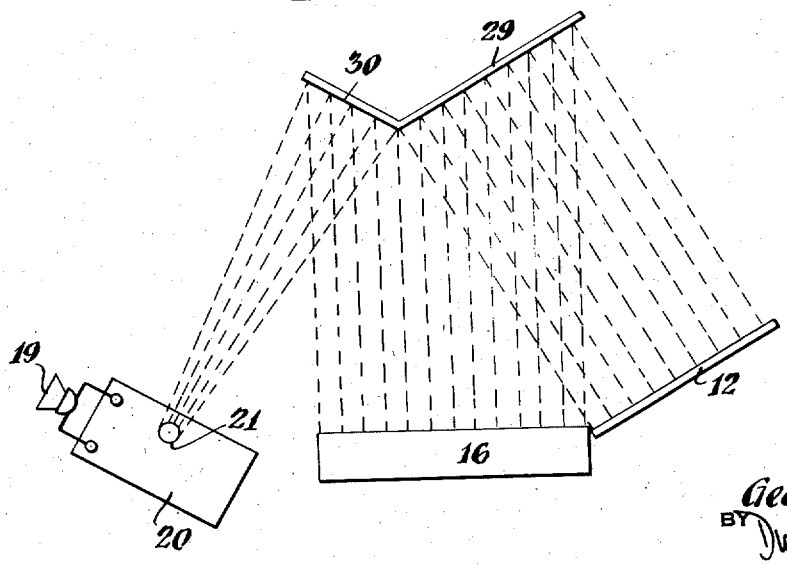
Fig. 10 is a diagrammatic view of another form of sending apparatus employing a magnetic ray tilting televisor.

Fig. 10 represents another form of sending apparatus to be substituted for the scanning discs. This construction is of the magnetic ray-tilter type of televisor as described heretofore in connection with Fig. 1, the cathode-ray tube 16 is similar to tube 6 and includes an angular mirror having two faces 29 and 30. The face 29 reflects the image ray to the photoelectric cell 16 and the face 30 reflects the audible signal ray to the same element such as the Braun tube of an ordinary magnetic ray-tilting type with magnetic deflecting coils for an electronic beam emitted by a filament. This device is illustrated as an alternative method of sending the image and audible signals using a photoelectric cell 16 in the form of a tube with magnetic ray deflectors. The principles of the invention in which these are employed remain the same as that heretofore described.

Figure 11:
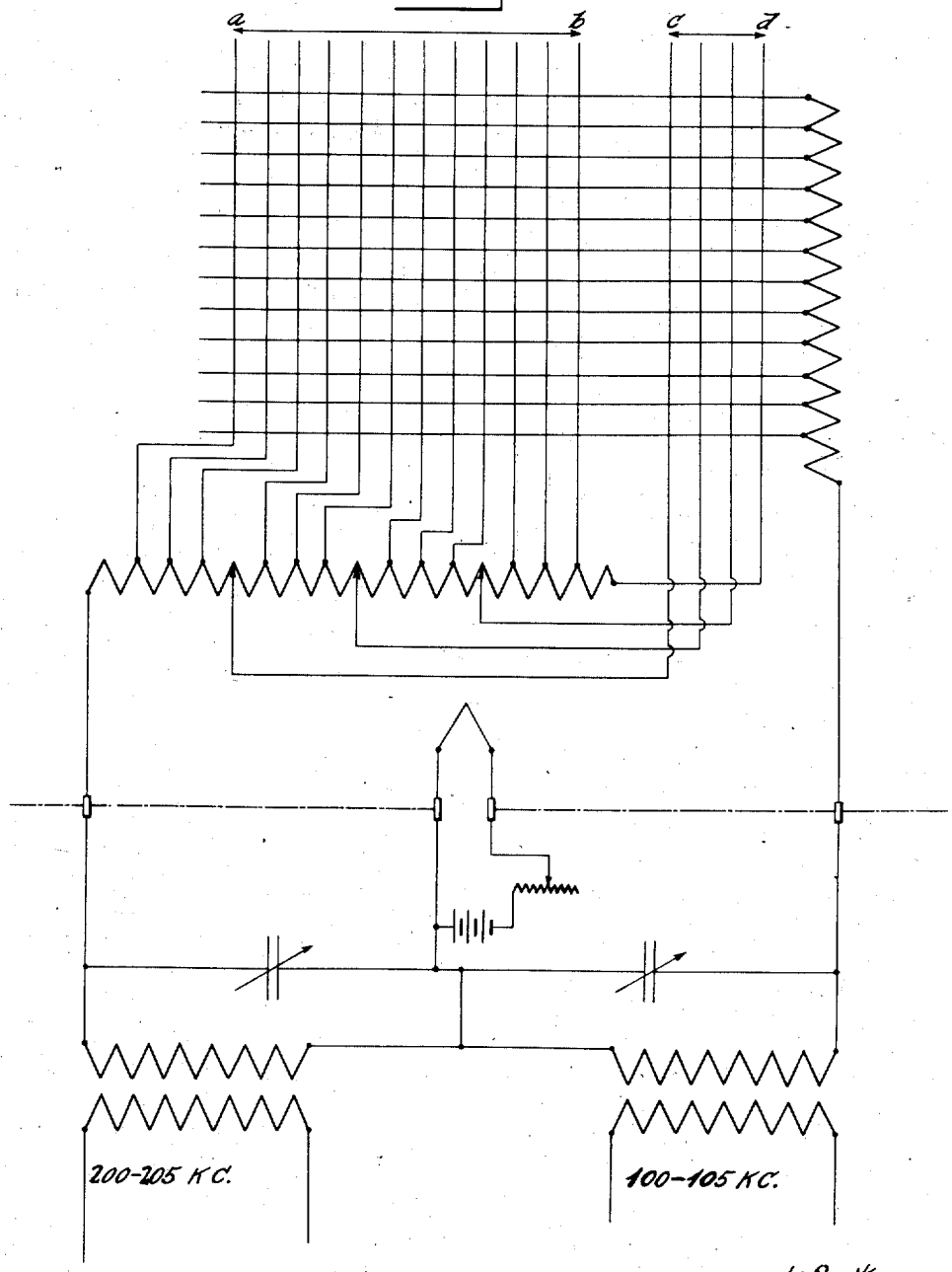
Fig. 11 is a diagrammatic view of a form of image signal and audible signal separator.

In Fig. 11 I have illustrated a special form of receiving or sending apparatus which is of the general type illustrated in my U. S. Patents Nos. 1,754,491; 1,790,736 and 1,810,692. In this figure there is shown diagrammatically a modification of the transmitter construction and of the receiving frame of my said prior applications. When considered as a transmitter it corresponds to my application Serial No. 389,383, now Patent No. 1,790,736, granted Feb. 3, 1931, and when considered as a receiver it corresponds to the receiving element of my U. S. Patents Nos. 1,754,491 and 1,810,692. The apparatus, which may be a receiver or a transmitter, comprises a screen formed by conductors 41 and 44 supported at right angles to each other and insulated from each other, with heated filament 39 under the screen. Conductors 41 are connected with consecutive taps of an induction coil 40, and the conductors 44 are similarly connected with taps of an induction coil 45, the coils being connected in tuned circuits with transformers 43 and 38 whose primaries 42 or 37 may be connected with a channel through which a variable frequency scanning current signal is transmitted. The coil 40 may be tuned for a lower frequency so that the wave crest may travel over all the wires 44 while a corresponding crest still remains on a single wire 41. A portion *a—b* of the screen can be used for picture transmission or reception, while the portion *c—d* may be used for audio signal transmission or reception. This apparatus is more fully described in my foregoing patents. The taps from the induction coil 45 may be taken off at intervals as shown in the present diagram, the taps running to the audible signal section of the apparatus. Thus, for example, when it is assumed that an image transmitted by the transmitter, as disclosed in this view of the drawings, is two inches wide, forty lines to the inch, the total number of lines representing the width of the image and the audible signals will be eighty vertical members, of which sixty will represent the image and twenty the audible signal. Thus, the first fifteen vertical elements will be that of the image, the next five vertical elements will represent the audible impulses, following across each line in the same sequence. Therefore, each line will have four audible signal impulses evenly distributed throughout the line tracing, and the audible impulses per second of the audible signal current will be $40 \times 80 \times 10$ (10 frames per second), or 32,000 impulses per second of the audible signal current.

This transmitter apparatus differs from the transmitter apparatus employing the scanning discs and the magnetic ray-tilting devices in that the audible signals are arranged as intermittent signals in respect of the image signals per line, thus avoiding the relatively sharp separation between the signals and causing them to be transmitted and received intermittently instead of in series for each line.

From the foregoing description it will be understood that the invention fully accomplishes its purposes. It will also be understood that it may be modified in many particulars without departing from the spirit and scope thereof.

What I claim and desire to secure by Letters Patent is:

1. An apparatus of the class described comprising means for translating an audible signal into a light impulse, a transmitter apparatus having an electrical impulse producing element, means responsive to light impulses for influencing said element, means for successively controlling said light responsive means by said translating means and by image reflection whereby a chain of electrical impulses are transmitted, and for receiving and converting said chain of electrical impulses into visible and audible signals.

2. In an apparatus of the class described, a photo-electric cell, a scanning disc whereby said cell may be influenced to produce a series of high frequency electrical impulses corresponding to points on an object, means for translating sound waves into light rays and which is positioned and adapted to influence said cell successive to and apparently concurrent with reflected light from the object, means for transmitting electrical impulses produced by said cell, and means for receiving said electrical impulses and translating them into visible and audible signals with apparent simultaneousness.

3. An apparatus for the transmission of signals comprising means for producing a carrier wave, means for scanning alternately and successively line by line an image and a sound track corresponding to audible signals, means for modulating said carrier wave by light rays under the influence of said scanning means whereby the carrier wave is first modulated by a line of the image and then by a line of the sound track, and means for receiving and translating said modulated carrier wave into visible and audible signals with apparent simultaneousness.

4. The method of transmitting visible and audible signals with apparent simultaneousness which comprises producing a sound track corresponding to audible signals, producing a carrier wave, scanning alternately and successively line by line an image and the sound track, modulating said carrier wave by light rays under the influence of said scanning means whereby the carrier wave is first modulated by a line of the image and then by a line of the sound track, and receiving and translating said modulated wave into visible and audible signals.

5. An apparatus of the class described comprising a transmitting apparatus having a photo-electric impulse producing element, means for successively influencing said element by image reflection and by audible signals, whereby a chain of impulses produced by said element may be transmitted, and means including a source of light-rays for receiving the chain of impulses and separating the impulses in said chain to utilize the portions of the rays produced under the influence of the image reflection to produce an image and the portions of the rays produced under the influence of audible signals to produce sound.

6. A method of transmitting visible and audible signals with apparent simultaneity which comprises scanning a picture in line areas, developing from said scanning a series of electrical impulses, developing between successive line areas a series of impulses corresponding to sound signals, successively modulaitng a single carrier by said signals, transmitting and receiving said carrier, and translating said impulses into picture and sound signals.

7. The method of transmitting visible and audible signals with apparent simultaneity which comprisese scanning a picture in line areas, developing from said scanning a series of electrical impulses, developing between successive line areas a series of impulses corresponding to sound signals, successively modulating a single carrier by said signals, transmitting and receiving said carrier, converting said series of impulses into light rays, impressing that portion of the light ray corresponding to the picture signal on a screen to form an image, and translating that portion of the light rays corresponding to sound into audible signals.

8. An apparatus of the class described comprising means for scanning a picture in line areas thereby generating a series of image signal impulses, means for developing between successive line areas a series of impulses corresponding to sound signals, means for successively modulating a single carrier by said signals, means for transmitting and receiving said carrier, and means for translating said impulses into picture and sound signals.

9. An apparatus of the class described comprising means for scanning a picture in line areas thereby generating a series of image signal impulses, means for developing between successive line areas a series of impulses corresponding to sound signals, a single carrier modulated by said image and sound signal impulses, means for transmitting and receiving said carrier modulated aforesaid, and means for translating said impulses into picture and sound signals.

10. A method of transmitting visible and audible signals which comprises scanning a picture in line areas, developing from said scanning a series of electrical impulses, developing between successive line areas a series of impulses corresponding to sound signals, modulating a single carrier by the aforesaid visible and audible signals, transmitting and receiving the said carrier, reducing the single carrier to separate electrical visible and audible signal impulses, and translating said electrical impulses into picture and sound signals.

11. A composite television and sound transmitter comprising means for scanning a portion of a picture less than a whole frame, means for developing from said scanning a series of image signal impulses, means for developing impulses corresponding to sound signals between said picture signals, a single photoelectric cell successively actuated by said signals, and means for transmitting said signals.

12. An apparatus of the class described comprising a transmitting apparatus having an electric impulse producing element, a sound and image film for successively influencing said element by the image reflection and by the audible signals produced at the end of each picture line, means whereby a chain of impulses, produced by said element, may be transmitted comprising a single carrier, and means for receiving the chain of impulses and separating the impulses in said chain to utilize these produced under the influence of the film image reflection to produce an image and those produced under the influence of the film audible signal reflection to produce sound.

13. The method of transmitting visible and audible signals with apparent simultaneousness which comprises modulating a single light sensitive source by a light-influenced by a sound and image film thereby producing successively series of electrical impulses corresponding to visible signals and a series of electrical impulses corresponding to audible signals and produced at the end of each picture line, impressing the series of impulses upon a carrier, and receiving and translating said impulses into visible and audible signals.

14. An apparatus of the class described comprising a station for initiating electrical impulses responsive to the presence of a visual image, a station for creating electrical impulses responsive to audible signals spaced successively between visual electrical impulse series of less than a whole frame but equal to or greater than a line, means for impressing said visual and audible impulses on a single carrier wave and means for receiving said impulses from said carrier wave and separating and translating the same to produce visual and audible signals.

15. An apparatus of the class described including in combination means responsive to the presence of a visual image for creating an electrical impulse, additional means spaced therefrom and responsive to the presence of audible signals for creating additional electrical impulses, a film carrying synchronized images and sound track thereon, said images and sound track being spaced longitudinally of said film so that when the image of said film is in registry with the image responsive electrical impulse producing element the corresponding portion of the sound track is in substantial registry with the sound responsive electrical impulse producing element, means for successively impressing said line series of image and sound impulses upon a single carrier wave, the sound impulses being put on the carrier between image impulse series less than a whole frame but equal to or greater than a line, and means for receiving said impulses from said carrier wave and separating and translating same to produce visual and audible signals.

16. An apparatus of the class described comprising means for scanning a picture in line areas thereby generating a series of image signal impulses, means for developing between successive line areas a series of impulses corresponding to sound signals, means for successively transmitting and receiving said signal impulses, and means for translating said impulses into picture and sound signals.

17. A method of transmitting visible and audible signals which comprises scanning a picture in line areas, developing from said scanning a series of electrical impulses, developing between successive line areas a series of impulses corresponding to sound signals, successively transmitting and receiving said signal impulses, and translating said impulses into picture and sound signals.

18. An apparatus of the class described comprising means for scanning a picture in line areas, means for developing a series of partial impulses which when integrated correspond to a sound signal, a carrier, means for placing a picture line signal on the carrier, means for placing a portion of the sound signal on the carrier in between successive picture line signals, and means for translating said impulses into picture and sound signals.

19. The method of transmitting visible and audible signals comprising scanning a picture in line areas, developing a series of partial impulses which when integrated correspond to a sound signal, placing picture line signals on a carrier, placing sound signals on the carrier in between picture signal intervals equal to or greater than a line scanning period but less than a frame period, and translating said impulses into picture and sound signals.

20. In an electronic television system a receiver for signals alternately corresponding to picture-light and related sound-light, comprising means including a scanner for translating said signals into light and for locating said light upon a field in distinct areas of picture-light and sound-light, the scanner being synchronized and the field being proportioned according to the occurrence of the two types of signals, the pictures being displayed upon the picture-light area of the field, and means for translating the sound-light of the field into sounds related to the pictures.

21. In an electronic television receiver for the reception of signals alternately corresponding to picture and sound intensities, means for converting said signals into light intensities, a screen divided into picture reproduction and sound-light receiving sections, said sound-light receiving section being relatively small with respect to the picture reproduction section, a scanner for directing the light intensities onto said screen synchronized with said signals to direct the alternate picture and sound light intensities to the respective sections of the screen, said picture-light intensities producing on the screen an image of the picture, and means for reconverting the sound-light intensities on the screen to sound.

GEORGE WALD.